Patented Feb. 28, 1939

2,148,971

UNITED STATES PATENT OFFICE

2,148,971

PROCESS FOR THE RECOVERY OF PURE, CONCENTRATED SULPHUR DIOXIDE

Conway, Baron von Girsewald and Gerhard Roesner, Frankfort-on-the-Main, Germany, assignors to American Lurgi Corporation, New York, N. Y., a corporation of New York No Drawing. Application May 21, 1937, Serial No. 144,096. In Germany June 23, 1936

5 Claims. (Cl. 23—178)

This invention relates to a process for the recovery of pure, concentrated sulphur dioxide.

In our prior application Serial No. 720,654, filed April 14, 1934, we have disclosed a process for the recovery of concentrated sulphur dioxide by treating gases containing said dioxide with a mixture of water and an organic base, preferably of low solubility in water—for example, an aromatic amine, such as a toluidine or a xylidine, and expelling the absorbed sulphur dioxide by heating the absorption liquid, the organic-base sulphate formed therein, by secondary reactions, being decomposed by the addition, for example, of a sodium compound such as the hydroxide, or a sodium salt of a weak acid such as carbonic acid or sulphurous acid into the free organic base and sodium sulphate which latter passes into solution in the aqueous portion of the mixture. By this means, the precipitation of the sparingly-soluble sulphate of the organic base and the consequent impediment to the continuance of the absorption process, is avoided, and the repeated employment of the absorption mixture is rendered possible.

By reason of the accumulation of sodium sulphate in the aqueous portion of the absorption liquid during the repeated employment of the latter, a certain portion of the absorption liquid must be continuously or intermittently withdrawn and replaced by fresh water.

In addition to sodium sulphate, the rejected solution contains—according to the nature of the organic base employed as the absorption medium—variable amounts of said base, the loss of which is calculated to have a more or less extensive adverse influence on the economy of the process. The organic base ordinarily is present in the aqueous phase partly in true solution and partly in suspension but is referred to hereinafter as being dissolved or in solution.

One object of the invention is the prevention of this loss of organic base, and the complete utilization of said base for practically unlimited re-employment.

A further object of the invention is a reduction in the amount of sodium compounds added, in accordance with our prior application Serial No. 720,654, for combining with the $SO_4$-ions formed by secondary reactions in the absorption mixture, and especially when, in accordance with our prior application Serial No. 60,532, filed January 31, 1936, the amount of said added compound is greater than is needed for combining with the $SO_4$-ions formed.

A further object of the invention is to avoid the introduction of undesired quantities of water with the sodium compound added in a dissolved condition in the case of the said earlier applications.

A further object of the invention is to bring about a saving of heat energy in effecting the expulsion of the absorbed $SO_2$ from the absorption liquid when operating in accordance with the processes of our aforesaid earlier applications.

Further details of the invention will become apparent as the description thereof proceeds.

It has been ascertained that the aforesaid losses of the organic base employed as absorption media sustained when operating in the above described manner, can be avoided by proceeding as follows: Instead of rejecting a suitable portion of the solution coming for example, from the column still and containing such an amount of sodium sulphate as apparently to render its further employment impracticable, the whole, or part, of said solution is cooled to a temperature (such as $+2°$ C. or less) which is, preferably, much below room temperature. The Glauber salt, containing water of crystallisation deposited under this treatment, is separated from the residual solution—by suction filtration, centrifuging or the like—and the mother liquor, which contains practically the whole of the originally dissolved organic base, is returned to the absorption process.

The Glauber salt may be removed at intervals, or—with particular advantage—continuously.

It is advisable to make sure that at the stage in which the Glauber salt is crystallised out, the whole of the sulphuric acid present is in combination with sodium and no sulphate of the organic base is present, since, otherwise, such sulphate would be deposited along with the Glauber salt, and the base would not be available for use over again.

A deficiency in the sodium content of the solution can be made good by the addition of sodium oxide, or hydroxide, or a sodium salt of a weak acid (such as a sodium carbonate, sulphite or bisulphite) in sufficient amount to ensure that the whole of the sulphuric acid present is in combination with sodium.

By proceeding in the above described manner, and continuously rejecting the Glauber salt formed, losses of organic base are avoided and practically the whole of the organic base which has passed into solution in the aqueous portion of the absorption mixture is again rendered available for the absorption process.

Apart from this advantage, the following additional advantages are afforded by operating in the described manner:

Firstly, the advantage that by returning to the absorption process the mother liquor from the Glauber salt crystallisation stage, not only such portions of the organic base that are retained in solution in the whole aqueous phase of the absorption mixture, but also any alkali—originally added in excess of that needed to combine with the sulphuric acid formed by secondary reactions—also present in the solution, in the form of hydroxide, carbonate or sulphite, is returned, without loss, into the absorption liquid. This is a matter of particular importance in operating in accordance with a further development described in application Serial No. 60,532, filed January 31, 1936, of the process of the application Serial No. 720,654, filed April 14, 1934, in which the alkali metal hydroxide, carbonate or sulphite is preferably added in such excess that at least a portion thereof in the aqueous phase of the absorption mixture after the expulsion of the sulphur dioxide, has not yet been consumed for the formation of sulphate and thiosulphate.

If, in operating in accordance with that process, suitable portions of the aqueous phase of the absorption mixture were to be continuously withdrawn for the purpose of removing the Glauber salt as and when formed, both the dissolved organic base and all the surplus alkali in solution (as such or in the form of sulphite), in the said rejected liquid would be wasted. By operating in accordance with the present invention, this alkali is retained in the process in the returned mother liquor from the crystallization of the Glauber salt. At the same time the further advantage is obtained that the mother liquor freed from the excess of Glauber salt can be utilized for dissolving the requisite sodium hydroxide, carbonate, sulphite or the like— serving as additions in accordance with the application Serial No. 720,654, filed April 14, 1934, or the application Serial No. 60,532, filed January 31, 1936—and that such additions may be introduced in a solid state. The addition of the said substances may also take place prior to crystallising-out the Glauber salt, in which event a portion of the organic base present in the aqueous portion separates out in a free state an can, if desired, be separated from the aqueous phase of the absorption mixture, whilst, at the same time, the amount of Glauber salt deposited is increased by the salting-out action of the added material.

Operating in this manner prevents that introduction of water into the absorption process which necessarily occurs when the alkali is added in a dissolved condition—for example by allowing a solution of sodium carbonate to run slowly into the upper part of the tower in which the gas, containing $SO_2$ is washed with the mixture of organic base and water.

However, operating in this manner according to the invention, not only dispenses with the continuous introduction of undesired solvent water and the consequent undesired progressive dilution of the absorption liquid, but, in addition, the continuous removal from the absorption mixture of the water of crystallisation of the deposited Glauber salt, provides a guarantee against the amount of water increasing to an undesired extent through introduction in other ways, such as from humid gases. On the other hand, in the event that the water of crystallization removed with the Glauber salt exceeds the amount of water introduced into the absorption mixture—from humid gases, for example—this deficiency can easily be made good by adding fresh water.

Finally, an especially important advantage of the process of the present invention consists in that, in carrying out said process there is no need, in expelling the absorbed sulphur dioxide, to continue the heating until the final traces of sulphur dioxide have been driven off and the organic base, previously in combination with sulphur dioxide, has been set free again in the absorption mixture, as far as possible, in which latter circumstances the expenditure of heat energy will be increased out of all proportion, by the amount needed to expel the final traces of the sulphur dioxide.

Since when operating in accordance with the present invention, complete recovery of the organic base remaining in solution in the aqueous phase of the absorption liquid is ensured, the expulsion of the sulphur dioxide need be carried only as far as is of advantage from the economic standpoint, and, after the surplus Glauber salt has been crystallised out, the aqueous phase of the absorption mixture which still contains comparatively larger quantities of the organic base, can be charged with a further excess of alkali and returned to the absorption process.

*Example I*

In the recovery of sulphur dioxide from roasting-furnace gases according to our prior application Serial No. 720,654, filed April 14, 1934, by employing a mixture of equal volumes of crude xylidine and water as the absorption medium there was obtained—after decomposing with sodium carbonate, the xylidine sulphate formed by secondary reactions—an effluent water containing 20.5 kg. of sulphur (in the form of $SO_4$) per cu. metre—corresponding to 205 kg. of Glauber salt ($Na_2SO_4.10H_2O$)—and 7 kg. of xylidine. This water was not run to waste but was cooled to zero C., whilst 138 kgs. of Glauber salt per cu. metre crystallized out which contained only 0.05% (0.07 kg.) of xylidine. The Glauber salt was separated from the solution by centrifuging, and the mother liquor (920 litres from each 1000 litres of effluent water) containing 7.2 kg. of sulphur (as $SO_4$) and 7.3 kg. of xylidine per cu. metre was returned to the $SO_2$ washing plant. In this manner 99% of the xylidine present in the effluent water was recovered.

*Example II*

In a plant in which sulphur dioxide was recovered from roasting-furnace gases, in accordance with our prior application Serial No. 720,654, filed April 14, 1934, by employing a mixture of toluidine and water containing sodium sulphite as absorbent, a content of Glauber salt, corresponding to about 10 kg. of sulphur per cu. metre, was maintained in the absorbent by continuously returning into circulation a portion of the absorption water from the column still—not directly, however, but after lowering the content of Glauber salt by cooling the liquid down to about 2° C. After the deposition of the Glauber salt, the mother liquor returned into circulation. The aqueous portion of the absorbent subjected to crystallisation contained 45 kg. of toluidine, 20 kg. of sulphur (as $SO_4$) and 32 kg. of sulphur (as sodium bisulphite) per cu. metre. The cooling down to +2° C. effected the crystallisation of 115 kg. of Glauber salt per cu. metre, with a toluidine content of only 0.03%. At the same time 880 litres of mother liquor with 7.3 kg. of sulphur (as $SO_4$) and 50 kg. of toluidine per cu. metre, were obtained. Whilst the Glauber salt was practically free from toluidine and alkali metal sulphite, the whole of the alkali and toluidine still contained in the mother liquor was rendered useful by returning the mother liquor into the circulation.

We claim:—

1. In the cyclic process for the recovery of concentrated sulphur dioxide comprising washing a gas containing sulphur dioxide with a mixture of water and a sparingly soluble organic base, expelling the absorbed sulphur dioxide from the mixture by heating, treating the mixture with a sodium compound capable of decomposing the sulphate of the organic base thereby liberating the organic base and forming sodium sulphate, which latter dissolves in the aqueous phase of the absorption mixture, removing at least a part of the sodium sulphate from the circulating mixture together with a portion of the water of the aqueous phase and returning the mixture to the absorbing operation; the steps which consist in separating at least that portion of the aqueous phase of the mixture which contains the amount of sodium sulphate to be removed, cooling the separated portion of the aqueous phase to a temperature not higher than 2° C. sufficient to effect the deposition of said amount of sodium sulphate in the form of Glauber's salt, separating the deposited Glauber salt from the mother liquor, and reusing the latter in the continuation of the cyclic process.

2. Process as defined in claim 1 in which the amount of sodium compound used for treating the mixture is at least sufficient to combine with all of the sulphate of the organic base present in the mixture.

3. Process as defined in claim 1 in which the amount of sodium compound used for treating the mixture is at least sufficient to combine with all of the sulphate present in the mixture and to provide an excess over that required for the formation of sulphate and thiosulphate.

4. Process as defined in claim 1 in which at least a portion of the sodium compound required for treating the mixture in the succeeding cycle is dissolved in the portion of the aqueous phase of the mixture from which the Glauber salt has been separated.

5. Process as defined in claim 1 in which the $SO_2$ absorbed in the mixture is only partially expelled by heating at each cycle of the process.

CONWAY BARON VON GIRSEWALD.
GERHARD ROESNER.